United States Patent [19]

Lecouturier et al.

[11] Patent Number: 5,123,879
[45] Date of Patent: Jun. 23, 1992

[54] VARIABLE SPEED TRANSMISSION DEVICE

[75] Inventors: Fabrice Lecouturier, Decize;
 Christian Ledevehat,
 Clermont-Ferrand; Robert Colley,
 Decize; Olivier Parguez,
 Pont-du-Chateau, all of France

[73] Assignee: Caoutchouc Manufacture et Plastiques, Versailles, France

[21] Appl. No.: 607,540

[22] Filed: Nov. 1, 1990

Related U.S. Application Data

[62] Division of Ser. No. 295,951, Jan. 11, 1989, Pat. No. 4,968,288.

[30] Foreign Application Priority Data

Jan. 11, 1988 [FR] France .................. 88 00244

[51] Int. Cl.$^5$ .............................................. F16G 1/22
[52] U.S. Cl. ................................................ 474/242
[58] Field of Search ............... 474/201, 237, 242–245

[56] References Cited

U.S. PATENT DOCUMENTS

| | | | |
|---|---|---|---|
| 3,720,113 | 3/1973 | Van Doorne et al. | 74/236 |
| 4,080,841 | 3/1978 | Vollers | 74/236 |
| 4,213,350 | 7/1980 | Horowitz et al. | 474/264 |
| 4,299,586 | 11/1981 | Aberson | 474/201 |
| 4,303,403 | 12/1981 | Lamers | 474/242 X |
| 4,338,081 | 7/1982 | Hattori et al. | 474/201 |
| 4,340,378 | 7/1982 | Russ, Sr. | 474/244 |
| 4,433,965 | 2/1984 | Hattori et al. | 474/201 |
| 4,610,648 | 9/1986 | Miranti, Jr. | 474/242 |

FOREIGN PATENT DOCUMENTS

| | | |
|---|---|---|
| 0000802 | 2/1979 | European Pat. Off. . |
| 0014013 | 8/1980 | European Pat. Off. . |
| 0014014 | 8/1980 | European Pat. Off. . |
| 0026534 | 4/1981 | European Pat. Off. . |
| 0073962 | 3/1983 | European Pat. Off. . |
| 0109132 | 5/1984 | European Pat. Off. . |
| 0109556 | 5/1984 | European Pat. Off. . |
| 0242263 | 10/1987 | European Pat. Off. . |
| 2557724 | 6/1977 | Fed. Rep. of Germany . |
| 2089587 | 12/1971 | France . |
| 2242608 | 3/1975 | France . |
| 2437531 | 4/1980 | France . |
| 2414664 | 8/1980 | France . |
| 2480885 | 10/1981 | France . |
| 2527723 | 12/1983 | France . |
| 2536486 | 5/1984 | France . |
| 2540953 | 8/1984 | France . |
| 2536487 | 3/1985 | France . |
| 2587777 | 3/1987 | France . |
| 2594513 | 8/1987 | France . |
| 0014492 | 6/1982 | Japan . |
| 80/02060 | 10/1980 | PCT Int'l Appl. . |
| 84/04950 | 12/1984 | PCT Int'l Appl. . |

OTHER PUBLICATIONS

Patent Abstracts Of Japan, vol. 11, No. 302 (M–629), Oct. 2, 1987, JP–62–93536 (Toyota Motor Corp.).
Patent Abstracts Of Japan, vol. 11, No. 380 (M–650), Dec. 11, 1987, JP–62–151644 (Honda Motor Co., Ltd).
Patent Abstracts Of Japan, vol. 11, No. 380 (M–650), Dec. 11, 1987, JP–62–151645 (Honda Motor Co., Ltd).
Patent Abstracts Of Japan, vol. 11, No. 221 (M–608), Jul. 17, 1987, JP–62–37537 (NHK Spring Co., Ltd).

*Primary Examiner*—Thuy M. Bui
*Attorney, Agent, or Firm*—Nils H. Ljungman & Associates

[57] ABSTRACT

A transmission mechanism for continuously variable transmissions comprises at least one endless flexible connecting element which is non-metallic, flexible, quasi-inextensible longitudinally, and a plurality of transverse links, also non-metallic. Each link includes at least one groove in which is engaged the endless flexible connecting element. The transmission mechanism is further characterized by the fact that the coefficient of friction between the endless flexible connecting element and the transverse links is a maximum of 0.4. The transverse links, which are axially perfectly symmetrical, have on each of their faces, a device for guidance of the transverse links relative to one another.

28 Claims, 8 Drawing Sheets

FIG_5

FIG_7

FIG_9a

FIG_9b

VARIABLE SPEED TRANSMISSION DEVICE

This is a division, of application Ser. No. 07/295,951, filed on Jan. 11, 1989.

BACKGROUND OF THE INVENTION

1. Field of the Invention

This invention relates to continuously variable speed transmission devices and, more specifically, to such variable speed transmission devices which include a mechanism for the transmission of power between grooved pulleys wherein the transmission mechanism includes at least one endless belt having a plurality of transverse rigid elements called links.

2. Description of the Prior Art

Numerous continuously variable speed transmission devices have been proposed, such as those described in U.S. Pat. No. 4,213,350 or French Patents Nos. 2,242,608 and 2,437,531 (Varitrac); French Patents Nos. 2,587,777 and 2,594,513 (Ford), 2,480,885 (Borg-Warner) or 2,414,664 (Guirriec); U.S. Pat. Nos. 4,338,081 (Nippondenso) and 4,340,378 (Gates Rubber); or International Patents Nos. WO 80/02060 (David & Ttard) or WO 84/04950 (Dayco); and numerous patents held by Van Doorne, such as, French Patent No. 2,089,587; U.S. Pat. Nos. 3,720,113 and 4,080,841; or European Patents Nos. 0,000,802, 0,014,013, 0,014,014, 0,014,492, 0,026,534 and 0,109,132.

There are different devices for the same application disclosed in European Patent No. 0,242,263 (Hutchinson) and French Patents Nos. 2,527,723, 2,536,486 and 2,536,487, or European Patent No. 0,109,556 (Michelin).

The majority of the inventions described in the above-mentioned patents, with the exception of those in the Hutchinson, Dayco and Michelin patents, use flexible connecting elements comprising metal bands and generally metal transverse links. Oil lubrication is required for the connecting elements to compensate for friction, and it is not uncommon to use special steels and employ very close tolerances, such as those found in the Van Doorne transmissions.

The devices of the prior art are often noisy, because the links tend to collide with one another at the entrance to or at the exit from the grooved pulleys or even in the sections of the belt between the pulleys. As a result, after several hours of use, there is significant wear of the endless belt and the links which can result in a misalignment of the transverse links and a poor operation of the entire apparatus.

In some double-belt systems, such as those described in European Patents Nos. 0,014,013 and 0,109,132 (Van Doorne) or WO 84/04950 (Dayco), it has been considered necessary to employ complex devices to keep the endless belts from escaping from the grooves of the links. Numerous shapes of links or tangent plates are utilized in continuously variable transmissions as evidenced by those described in U.S. Pat. Nos. 4,338,081 (Nippondenso) and 4,080,841 (Van Doorne); in French Patents Nos. 2,527,723, 2,536,486 and 2,536,487 (Michelin); and, in particular, in European Patents Nos. 0,000,802, 0,014,013, 0,014,492, 0,026,534 and 0,109,132 (Van Doorne). All of the tangent plates described in these documents include cross sections which are essentially trapezoidal and employ at least one groove in which at least one endless belt is engaged.

One of the problems most frequently encountered in this type of transmission by tangent plates rests in the guidance of these tangent plates at the entrance to and exit from the grooved pulleys. Accordingly, the prior art devices are often directed to such problems and, therefore, relate to means for holding the belt in the grooves and for guiding the transverse links relative to one another.

In order to keep the endless belt and the transverse links from coming apart, in the above-referenced patent held by Hutchinson, it is suggested that the transverse links can be connected to the longitudinal framework by means of an elastomer compound.

In order to solve the guidance problems, it is recommended, in the above-referenced patents held by Michelin, to give the longitudinal belt and/or the links special shapes, which tend to complicate the formation and production of the overall apparatus.

Other solutions for the guidance problem have been proposed, including the provision of at least one projection on one of the faces of the transverse links and at least one recess on the opposite face, as generally described in the European Patent No. 0,014,492 (Van Doorne). While such a device is apparently effective because it makes possible the engagement of a projection on one transverse link in a corresponding recess on the contiguous transverse link, it has the disadvantage of complicating the assembly of the transverse links on the endless belt, as the various faces must be aligned.

As a result, it has been found that the solutions to the above-mentioned problems, as proposed in most of the prior art devices, appear to include various disadvantages. For example, some such devices require a complex lubrication system including filters and purification devices for the lubricant. Others include fabrication problems due to the requirement for close tolerances and/or the need to use special steels and, therefore, result in very high production costs. Finally, some of the prior art devices employ complex assemblies which are still not able to completely eliminate the risks of malfunction or failure of the transmission.

All of the above-mentioned patents are incorporated herein by reference as if the entire contents thereof were fully set forth herein.

OBJECT OF THE INVENTION

The object of the invention is to propose a transmission mechanism for a continuous speed transmission which solves the problems of the prior art. Such a transmission mechanism should be reliable and capable of noiselessly transmitting high powers, without the need for lubrication. Additionally, such a transmission mechanism should also be easy to fabricate and thus economical to provide.

SUMMARY OF THE INVENTION

The transmission mechanism with thrusting transverse links for a continuously variable transmission which is the object of the invention operates by dry friction and comprises at least one flexible, non-metal endless flexible connecting element which is quasi-inextensible in the longitudinal direction and a set of non-metal transverse links. Each of the links has at least one groove in which the endless flexible connecting element is engaged. The preferred transmission mechanism is characterized by the fact that the coefficient of friction between the endless flexible connecting element and the transverse links is a maximum of 0.4. The transverse links, which are perfectly symmetrical, have on each of their faces a device to guide the links in relation to one another which does not require the matching of the faces for the installation of the transverse links on the connecting element or belt.

In a preferred embodiment, the endless flexible connecting element comprises at least one flat raw edge belt with an armature which comprises a continuous or discontinuous fiber with a high modulus, such as textile wires, cables or strands, such as aromatic polyamide, or metal wires, cables or strands. The belt would include at least one face which has a coating with a low coefficient of friction.

In another embodiment, the endless belt comprises two cables with an essentially circular cross section. The belts are quasi-inextensible longitudinally and manufactured from a textile or metal fiber with a high modulus.

The transverse links which are constituent elements of the transmission mechanism of the invention have at least one groove designed to hold the endless belt. The groove has a shape such that the endless belt can be and is forcibly introduced into it during the installation of the transverse links and may not escape from it during operation.

In one embodiment, the guidance system for maintaining the transverse links relative to one another includes, on each of the faces, an assembly comprising a centering lug and a recess located on the upper portion of the transverse link.

In another embodiment, the guidance system for maintaining the transverse links relative to one another comprises a set of positioning lugs which are arranged so that they are axially symmetrical and located in the base of the transverse link.

Still further, the objects of the invention are provided in a preferred embodiment thereof including a continuously variable speed transmission having a drive pulley and a driven pulley. Each of the drive pulley and the driven pulley have conical surfaces to provide variable diameters thereof. A transmission mechanism extends around each of the drive pulley and the driven pulley. The transmission mechanism includes at least one endless flexible connecting element and a plurality of links mounted on the endless flexible connecting element. Each of the links includes at least one groove for receipt of the endless flexible connecting element therein. Each of the lengths includes guide elements on the side faces thereof which mate with guide elements on adjacent links to maintain alignment of the links on the endless flexible connecting elements.

The invention also includes a transmission mechanism for a continuously variable speed transmission which has at least one endless flexible connecting element and plurality of links. Each of the links includes at least one groove for receipt of the endless flexible connecting element therein Each of the lengths includes guide elements on side faces thereof which mate with guide elements on adjacent links to maintain alignment of the links on the endless flexible connecting element.

DESCRIPTION OF THE PREFERRED EMBODIMENTS

Figure 1:
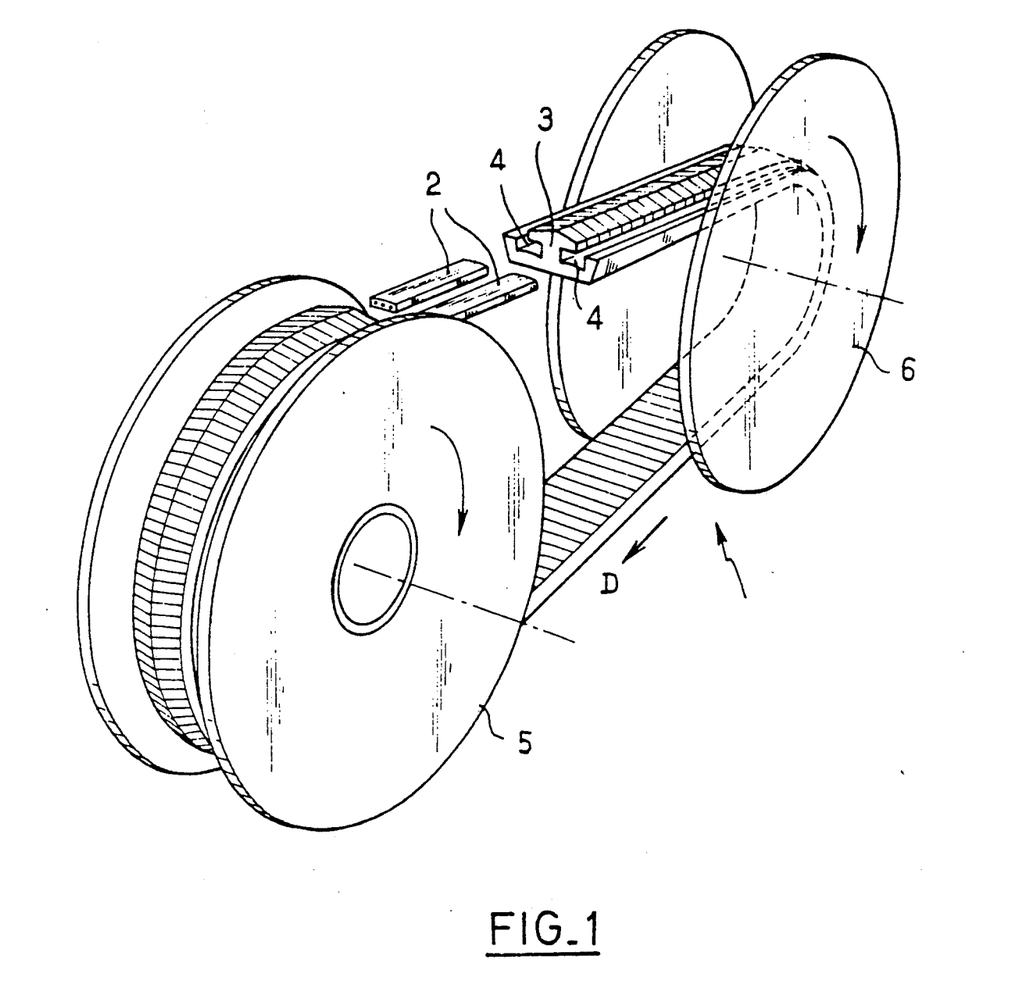
FIG. 1 is a schematic, perspective view of a continuously variable speed transmission device illustrating its operating principles and including various features of the invention.

FIG. 1 is a schematic, perspective view demonstrating the operating principle of an infinitely variable speed transmission device 1. The transverse links thereof are designed to receive two flexible connecting elements in the form of belts.

The transmission device 1 of FIG. 1 includes a pair of endless flexible connecting elements 2, in the form of belts, and a plurality of contiguous transverse links 3 having two grooves 4 for respectively receiving the elements 2 therein. The transmission device 1 is designed to provide drive in the direction D of the conical grooved pulley 5 by the pulley 6. The pulleys 5 and 6 respectively have variable diameters in order to produce positive, infinitely variable speed transmission.

Figure 3A:
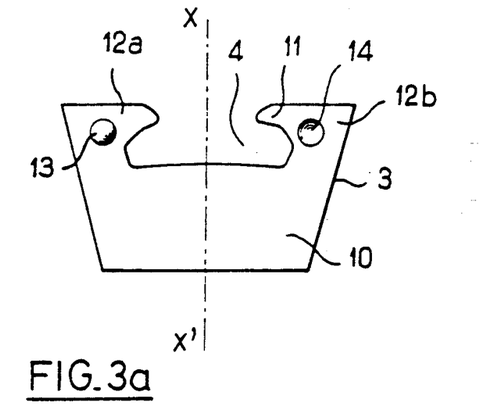
FIGS. 3a and 3b are side and end views of one particular shape of a preferred transverse link for a transmission device which includes a single endless flexible connecting element in the form of a belt.
Figure 3B:
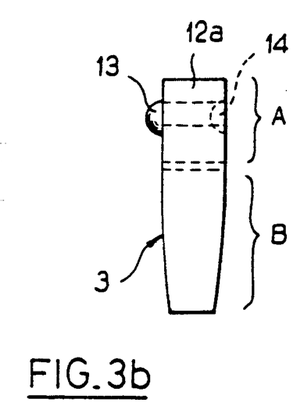
Figure 4A:
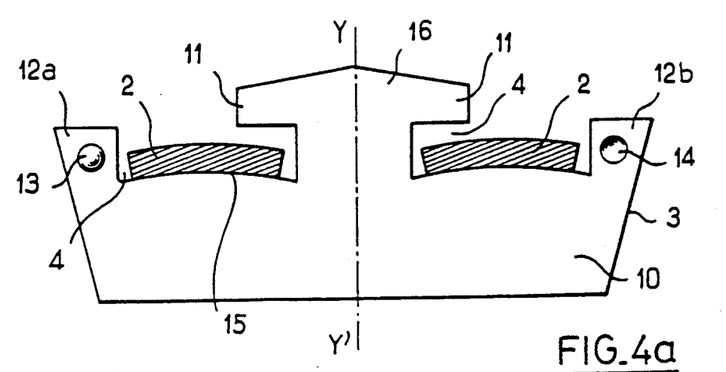
FIGS. 4a, 4b and 4c are side, top and end views of one preferred transverse link designed for a transmission device which employs two endless flexible connecting elements in the form of belts.
Figures 4B, 4C, 4D:
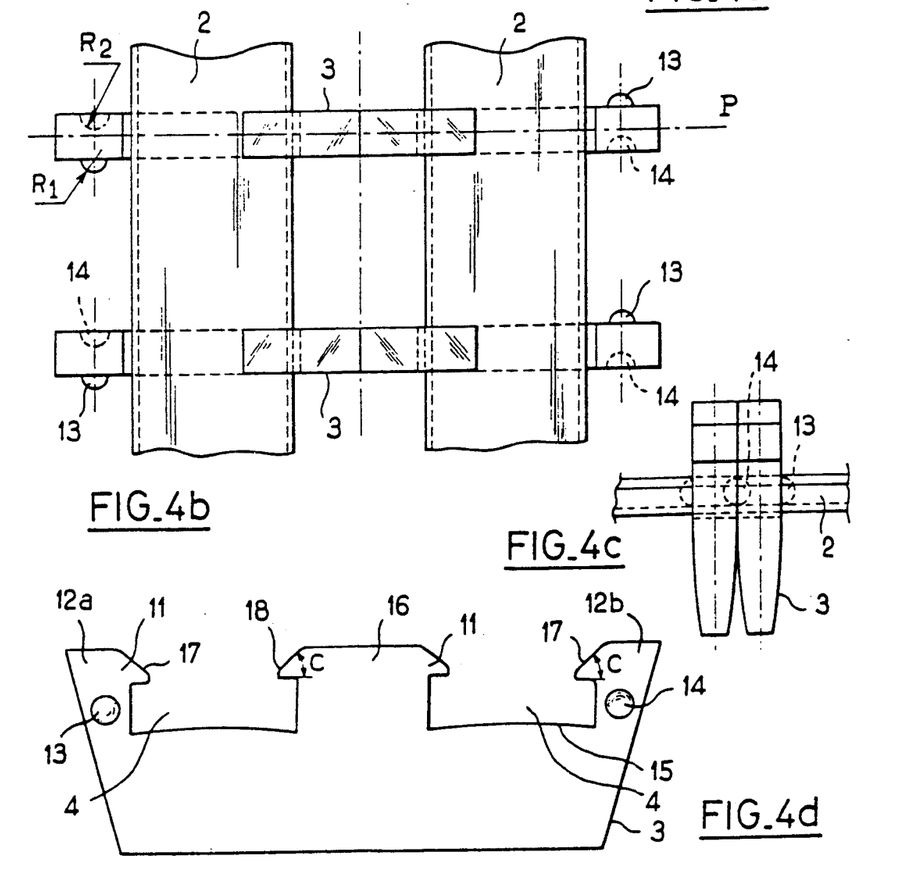
FIGS. 4d is a side view of another preferred transverse link designed for a transmission device which employs two endless flexible connecting elements in the form of belts.
Figure 5:
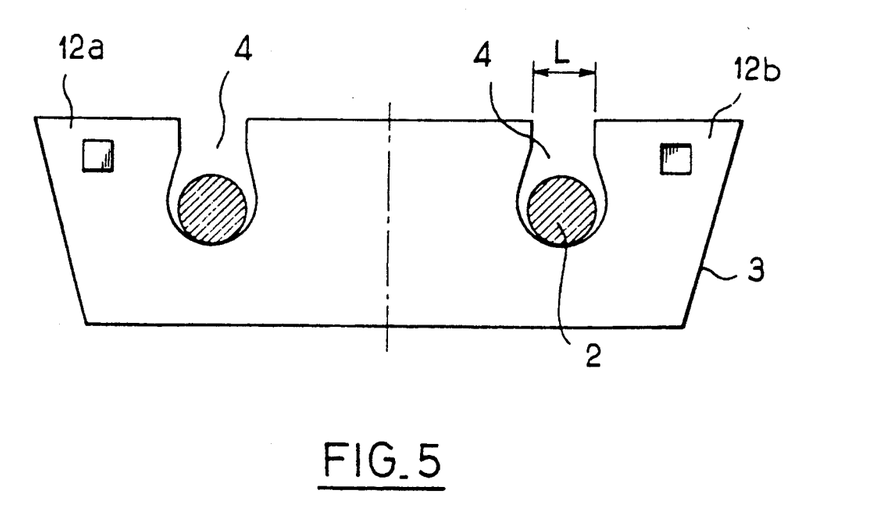
FIG. 5 is a side view of one variant of the transverse link which can be used in a transmission which includes two endless flexible connecting elements in the form of cables.

The transmission is basically achieved by the thrust of each transverse link 3 on the transverse link 3 which precedes it. The preferred guidance of the links 3 in relation to one another is provided, according to the invention, by a mechanical device which is part of each link 3. Different preferred embodiments of the invention are illustrated in FIGS. 3, 4 and 5. The transverse links 3, therefore, work by compression while the flexible connecting elements 2 function in a supporting role. The connecting elements 2 absorb the tension and transmit it to the transverse links 3 by contact, while compensating for any centrifugal forces which are exerted during operation.

Various alternative configurations of the transmission device 1 could include endless flexible connecting elements 2 in the form of cables with an essentially circular cross section or in the form of a belt with a hexagonal cross section. The corresponding transverse links 3 would include grooves 4 having a configuration adapted to the cross section of the particular endless flexible connecting element 2 used therein: The transmission device 1 could alternatively include only one endless flexible connecting element 2 in the form of a belt with links 3 having a single groove 4 having a shape appropriate to that of the endless flexible connecting element employed therein.

Figure 2A:
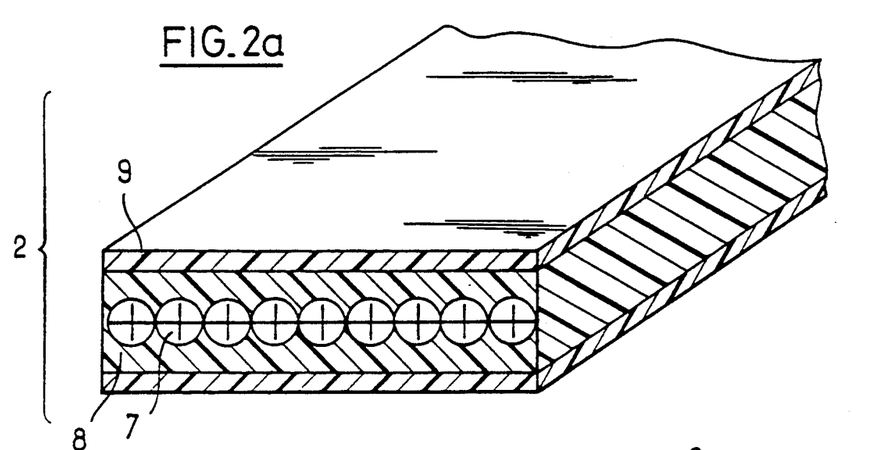
FIGS. 2a, 2b and 2c are cross-sectional views of three preferred alternative configurations of endless flexible connecting elements of the invention.
Figure 2B:
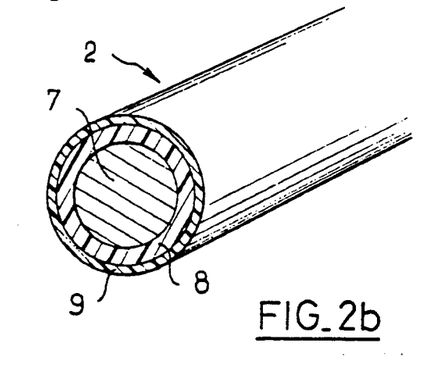
Figure 2C:
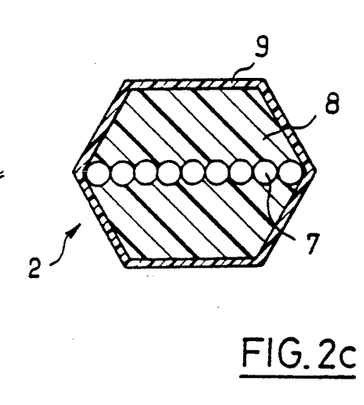

Such alternative configurations of the endless flexible connecting elements 2 are illustrated in FIGS. 2a, 2b and 2c while those of the transverse links 3 are illustrated in FIGS. 3a, 3b, 4a, 4b, 4c, 4d, and 5.

FIG. 2a includes, in cross-sectional view of a preferred endless flexible connecting element 2 in the form of a flat belt with an essentially rectangular cross section. FIG. 2b includes a cross-sectional view of another endless flexible connecting element 2 in the form of a cable with an essentially circular cross section.

The flexible connecting element 2 shown in FIG. 2a consists of a flat belt which is preferably, but not necessarily, of the so-called "exposed flanks" or "cut edge" type. This connecting element 2 includes longitudinal reinforcement elements 7 which are made of a quasi-inextensible material. The preferred reinforcement element 7 may be an aramid wire or strands, a metal wire or cable, or the like whose elongation at failure is a maximum of about ten percent.

The reinforcement element 7 is preferably embedded in a base 8 made of a flexible polymer compound and is intimately bonded thereto by physical-chemical means which are well-known in the polymer transformation industry.

The thickness of the base 8 of the flexible connecting element 2 of FIG. 2a will be relatively small above and below the reinforcement element 7 and will be adjusted according to the size of the transmission device. The polymer compound constituting the base 8 of the flexible connecting element 2 must be sufficiently flexible to enable the transmission mechanism to be wrapped around the pulleys. It will preferably include a formulation adapted to the application in a transmission mechanism which will permit it to withstand the fatigue, heating and aging stresses which transmission mechanisms encounter during operation.

The base polymers which can be used in the flexible polymer compound can be selected from a range of natural or synthetic rubbers or elastomers suitable to the application. A non-limiting list of examples of suitable base polymers would include polychloroprene, a copolymer of butadiene and acrylonitrile or one of its hydrogenated forms. The base polymers could also be selected from among the so-called "industrial" thermoplastic polymers, such as propylene polyoxide, a polyester-ketone, phenylene polysulfide, a polyamide or a polyimide.

If, as preferred in the present invention, the coefficient of friction between the constituent material of the transverse links 3 and the polymer compound of the base 8 of the endless flexible connecting element 2 is a maximum of 0.4, the endless flexible connecting element 2 might include only the two elements described above, the reinforcement element 7 and the polymer compound base 8.

On the other hand, as in the embodiment illustrated in FIG. 2a, a coating 9 of a material with a low coefficient of friction can be employed. The coating 9 should be relatively thin when compared to the thickness of the flexible connecting element 2 and can be added to at least the face which is in contact with the transverse links 3. The coating 9 will preferably be intimately bonded to the base 8.

A list of non-limiting examples of a suitable coating 9 which is made of the material with a low coefficient of friction could include an ethylene polytetrafluoride film. The ethylene polytetrafluoride film should be subjected to an appropriate treatment which is generally used in the polymer transformation industry to ensure its adherence to the polymer compound of the base 8 of the endless flexible connecting element 2. Still further, the coating 9 could include a synthetic fabric with a low coefficient of friction, such as polyamide, or an oil varnish.

In an embodiment of the invention where the polymer compound of the base 8 of the endless flexible connecting element 2 consists of an elastomer base formulation, the coating 9 of the material with a low coefficient of friction will be advantageously constituted of polyethylene with a very high molecular weight which, as is well known in the prior art, adheres to elastomers under certain conditions without the interposition of adhesive.

In FIG. 2a, the preferred endless flexible connecting element 2 includes two layers of the coating 9 with a low coefficient of friction although such a configuration is only optional. Likewise, it will be apparent to those skilled in the reinforced cable art that the flexible connecting element 2 may not include the cut edges as shown, but could alternatively be completely covered the coating 9 with a low coefficient of friction.

FIG. 2b includes a cross-sectional view of another endless flexible connecting element 2 which is formed by a cable with an essentially circular cross section. The connecting element 2 includes a similar inextensible reinforcement element 7 and a base 8 made of a similar polymer compound which is intimately bonded thereto. For obvious reasons of equilibrium of the transmission mechanism, it is necessary to use two endless flexible connecting elements 2 of the type with an essentially circular cross section in conjunction with a plurality of transverse links 3 which respectively employ two grooves for receipt of the connecting elements therein. As in the case of the endless flexible connecting element 2 of FIG. 2a in the form of a belt, a coating 9 with a low coefficient of friction may be added on the surface of the endless flexible connecting element 2 of FIG. 2b to improve the sliding between the connecting element 2 and its corresponding transverse links 3.

FIG. 2c includes a cross-sectional view of another form of a preferred endless flexible connecting element 2 including a hexagonal belt. The reinforcement element 7 of this connecting element 2 consists of longitudinal textile strands which are located in a central zone thereof. The base 8 is again made of a polymer compound with a suitable formulation. In the embodiment of FIG. 2c, the external coating 9 with a material with a low coefficient of friction completely surrounds the endless flexible connecting element 2. However, it would be obvious to those skilled in the art that the coating 9 with a low coefficient of friction could also be located only on the face of the endless flexible connecting element 2 in contact with the transverse links. The preferred transverse links (not shown), which are mounted on the endless flexible connecting element 2 having a hexagonal cross section, would obviously employ one or two grooves of a suitable shape.

The realization of the endless flexible connecting element illustrated in FIG. 2c, which is a torus, is part of the technology used for the fabrication of so-called "grommet" belts or for the production of tire cords.

Other methods also allow the realization of an endless flexible connecting element, of any desired cross section. It is possible, for example, to use a resin prepreg such as polyester reinforced with short fibers, or to mold a commercially available composite called "thermoplastic reinforced fiber", or to use an epoxy matrix fiber compound. All the techniques for the fabrication of the endless flexible connecting elements are familiar to the rubber and polymer transformation industry.

FIGS. 3a and 3b include one particular shape of a preferred transverse link 3 for a transmission of a type which includes a single endless flexible connecting element in the form of a belt.

FIG. 3a is a head-on view of one side of the transverse link 3 and shows the general shape which is essentially trapezoidal. The base 10 of the link 3 has, in its upper portion, a groove 4. The groove 4 is partly closed at the top by shoulders 11 at the upper edges thereof in the form of catches 12a and 12b of said transverse link 3. The groove 4 is designed to hold the endless flexible connecting element in the form of a belt therein, and the shoulders 11 of the lateral catches 12a and 12b are designed to prevent the endless flexible connecting element from escaping the interior of the groove 4 during operation.

One of the lateral catches 12a of the link 3 has a centering lug 13, on the side as seen in FIG. 3a, which is located approximately in the center of its length. The other lateral catch 12b, on the side as seen in FIG. 3a, has a recess 14. The recess 14 has a radius which is slightly greater than that of the centering lug 13. The lug 13 and the recess 14 are respectively located on their lateral catches 12a and 12b generally symmetrically along the axis XX'. The other face or side of the transverse link 3, that which is not visible in FIG. 3a, includes a recess 14 opposite the centering lug 13 of the lateral catch 12a and a centering lug 13 opposite the recess 14 of the lateral catch 12b. This relative arrangement of the centering lugs 13 and the recesses 14 on the two faces of the transverse link 3 can be seen in FIG. 3b, which includes an end view or profile of the transverse link 3 of FIG. 3a.

As also seen in FIG. 3b, the cross section of the transverse link 3 can be divided into two zones. Zone A is essentially rectangular, and Zone B is essentially trapezoidal. The height of Zone B is slightly greater than that of Zone A. In a transverse link 3 of FIG. 3b, a lateral catch 12a has, in Zone A, a centering lug 13 on one of the faces and a recess 14 on the opposite face. The radius of the recess 14 is preferably from five to ten per cent greater than the radius of the centering lug 13. As a result, the centering lug 13 of one link 3 can be engaged in the corresponding recess 14 of an adjacent link 3 without excessive friction. However, there is still limited clearance between the lugs 13 and the recesses 14 so that the adjacent transverse links 3 are effectively guided for alignment relative to one another.

FIGS. 4a, 4b, 4c and 4d include views of preferred transverse link 3 which are designed for a transmission comprising two endless flexible connecting elements in the form of belts.

FIG. 4a is a head-on view of one side of such a link 3 which shows that the general shape is essentially trapezoidal. The base 10 of the link 3 has, in its upper portion, two grooves 4. The grooves 4 are designed to hold the endless flexible connecting elements 2 in the form of belts and are symmetrical disposed relative to the axis YY'.

Preferably, the bottom 15 of the grooves 4 is slightly convex to encourage the centering of the endless flexible connecting element 2 during operation and to keep its flanks from coming into contact with the edges of the grooves 4. By way of example, for a preferred transverse link 3 of FIG. 4 having a large base of eighteen millimeters, the radius of the convex portion of the bottom 15 of the groove 4 should be greater than twenty millimeters, and preferably greater than fifty millimeters, to prevent the off-center positioning of the endless flexible connecting element 2.

As seen in FIGS. 4a and 4b, the grooves 4 are partly closed at the top by the shoulders 11 of a central catch 16 to keep the endless flexible connecting element 2 from escaping the grooves 4 during operation while allowing an easy installation of the transverse links 3 on the endless flexible connecting elements 2. On the face of the link 3 as seen in FIG. 4a, the lateral catch 12a of the transverse link 3 has a centering lug 13 and the other lateral catch 12b has a recess 14. The lug 13 and the recess 14 are disposed on the same surface in a basic symmetrical location relative to the axis YY'.

The plan top view in FIG. 4b shows a basic layout of two transverse links 3 which are clearly separated from one another on the two endless flexible connecting elements 2 in the form of belts. Separation in this manner would occur during installation. Each of the transverse links 3 has the centering lug 13 and the recess 14 on each face thereof. The centering lug 13 of one face is symmetrical, with respect to the plane P, with the recess 14 of the opposite face. The radius R2 of each recess 14 will be slightly greater than the radius R1 of each centering lug 13, preferably by five to ten percent. As a result, each centering lug 13 can be engaged without force or excessive friction in the corresponding recess 14 but, nevertheless, with a limited clearance so that the guidance of the transverse links 3 relative to one another remains effective.

The profile or end view of FIG. 4c shows the layout of two contiguous transverse links 3 of the type shown in FIGS. 4a and 4b in the operating position on the endless flexible connecting elements 2. When in the operating position, there is engagement of the centering lug 13 of each of the transverse links 3 in the corresponding recess 14 of the other transverse link 3.

FIG. 4d is a head-on or side view of another transverse link 3 which is designed for a transmission which uses two endless flexible connecting elements 2 in the form of belts. In this configuration, the grooves 4 of the transverse link 3 again include bottoms 15 which are slightly convex. The grooves 4 are partly closed at the top by shoulders 11 of the lateral catches 12a and 12b and of the central catch 16 to maintain the endless flexible connecting elements in the grooves 4 during operation. As seen in FIG. 4d, the front face of the catch 12a of the transverse link 3 has a centering lug 13, while the front face of the catch 12b is provided with a recess 14.

Advantageously in this arrangement, the faces 17 of the shoulders 11 of the lateral catches 12a and 12b and of the central catch 16 respectively have a crest which is inclined at an angle C of approximately forty-five degrees and a rounded extremity 18. Such faces 17 facilitate the installation of the endless flexible connecting elements in the grooves 4 of the transverse link 3 without causing any damage to the endless flexible connecting elements which could otherwise occur if the shoulders 11 included sharp edges. The installation of the endless flexible connecting element in the grooves 4 of the transverse links 3 is an easy operation because the lateral flexibility of the endless flexible connecting element and the low coefficient of friction of its coating tend to eliminate excessive resistance and friction.

FIG. 5 is a head-on or side view of another transverse link, which is of a type for use in a transmission having two endless flexible connecting elements in the form of cables having an essentially circular cross section. In this configuration, the transverse link 3 again includes a general shape which is essentially trapezoidal. The link 3 has two grooves 4 which are designed to receive endless flexible connecting elements 2 in the form of cables. Each groove 4 has a cross section with a lower portion which is semi-circular and a top opening which has a width L less than the diameter of the semi-circular lower portion to keep the endless flexible connecting element 2 within the groove 4 during operation. As in the other transverse links 3 described above, the front face or side of the lateral catch 12a, as seen in FIG. 5, has a preferred centering lug which has a square shape. A symmetrical recess (not shown) on the back face or side of the lateral catch 12a has a similar shape but is five to ten percent larger. The lateral catch 12b has a similar square recess on the front face and a symmetrical, smaller centering lug on the back face thereof.

Figure 6A:
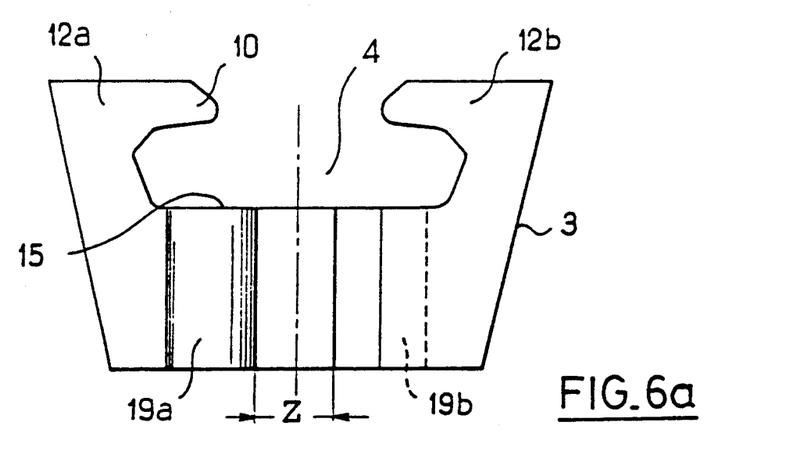
FIGS. 6a, 6b, and 6c are side, top and assembly views of another preferred transverse link of a type which includes positioning or guiding lugs.
Figure 6B:
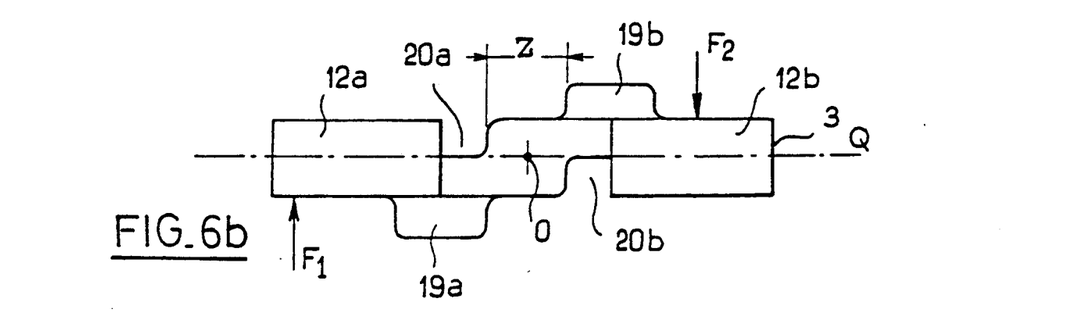
Figure 6C:
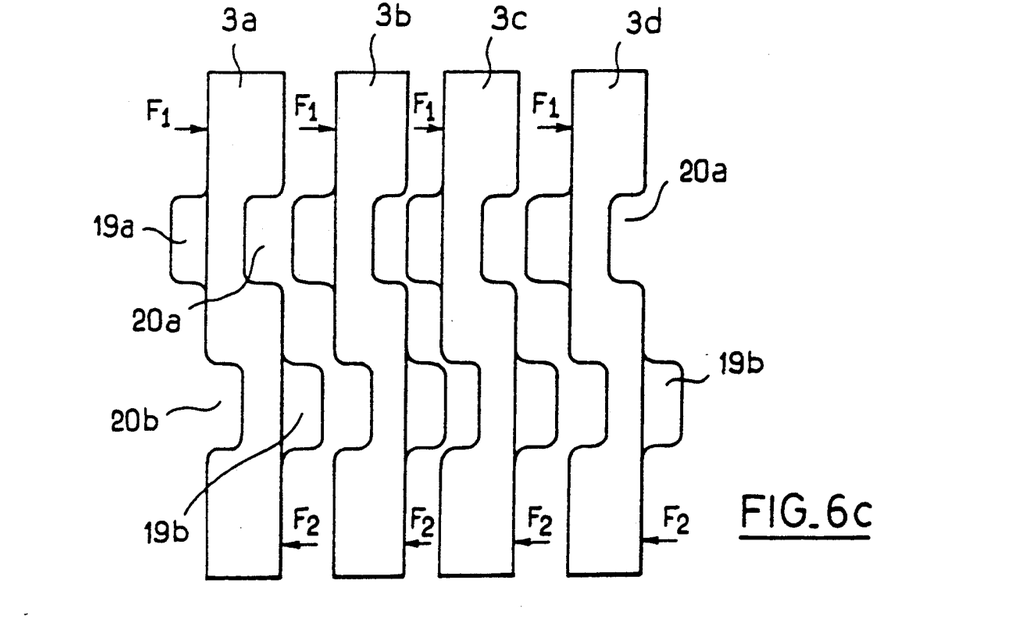

FIGS. 6a, 6b and 6c include another preferred device, in the form of positioning lugs, to guide the transverse links. Although the preferred transverse link 3 includes a single groove 4, it is apparent that the following description could be easily adapted to provide an alternative link with two grooves.

FIG. 6a is a head-on or side view of an alternative transverse link 3 having a groove 4 designed to hold an endless connecting element. The groove 4 could again advantageously be formed to include a bottom 15 which is slightly convex. The groove is partly closed in its upper portion by the shoulders of lateral catches 12a and 12b, which do not include centering lugs and recesses.

The guidance of these transverse links 3 relative to one another is provided by the particular shape of the base 10 of the transverse links 3. The base 10 includes positioning lugs 19a and 19b, which are respectively located on opposite sides of a central zone Z and project beyond the opposite faces of the link 3. The base 10 also includes corresponding recesses 20a and 20b on the opposite faces relative to the central plane Q of the transverse link 3.

The plan or top view of FIG. 6b shows the arrangement of the positioning lugs 19a and 19b relative to the center plane Q which generally divides the catches 12a and 12b and the central zone Z into two parts of equal thickness. The positioning lug 19a projects outward on the face F1 and is generally aligned with a corresponding recess 20a on the face F2. Since the link 3 is symmetrical, the lug 19b projects outward on the face F2 and is generally aligned with the corresponding recess 20b on the face F1. The transverse link 3 has an axial symmetry around a center axis O.

FIG. 6c shows the pawl and ratchet engagement of several transverse links of the type shown in FIGS. 6a and 6d. The engagement is shown with exaggerated clearance to illustrate the relative positions of the transverse links 3a, 3b, 3c and 3d. Each face F1 of the transverse links 3a, 3b, 3c and 3d has a lug 19a and a recess 20b and each face F2 has a lug 19b and a recess 20a. As a result, the lug 19a of the face F1 of the transverse link 3d is housed in the recess 20a of the face F2 of the transverse link 3c. Simultaneously, the recess 20b of the face F1 of the transverse link 3d receives the lug 19b of the face F2 of the transverse link 3c. In a similar manner, the lug 19a of the face F1 of the transverse link 3c is housed in the recess 20a of the face F2 of the transverse link 3b while the recess 20b of the face F1 of the transverse link 3c receives the lug 19b of the face F2 of the transverse link 3b.

The different variant shapes of the transverse links illustrated in the above-mentioned figures are possible. Preferably, the devices to guide the transverse links relative to one another have the same type of engagement and are characterized by a perfect symmetry of the faces. Typically, each will have in opposition a male element, respectively consisting of either an essentially circular or rectangular centering lug or a positioning lug, and a female element, consisting of either a corresponding essentially circular or rectangular recess or a recess which corresponds to the positioning lug. Such arrangements eliminate the need to match the faces of the transverse links for assembly and permit easy automation of assembly. In fact, it will be readily apparent to those skilled in the art that the device for guiding the transverse links relative to one another can include simultaneously a device with the centering lugs and a device with positioning lugs.

The preferred transverse links 3 of the various types discussed hereinabove can be manufactured of a high-modulus polymer compound comprising a matrix of a so-called "industrial" thermoplastic or thermosetting polymer which is reinforced by mineral or organic additives in powder form; by spherical additives such as glass balls; or by short textile or metal fibers which are preferably not longer than 30 millimeters. For reasons of fabrication economy, the polymer compound of which the transverse link is manufactured can preferably be formed by injection molding.

By way of non-limiting examples, the polymer for the matrix will be selected from the thermoplastic polymers, among thermoplastic polyester or polyamide or semi-organic polyamide or polyimide resins, and from the thermosetting polymers, among thermosetting polyester resins, epoxy resins, formo-phenol resins or urea-formol resins.

Among the powder additives, talc, chalk or even powdered metals, such as aluminum, can be advantageously used.

Another method of discontinuous reinforcement of the polymer of the matrix consists of a short fiber with a high modulus such as aramid fiber, glass fiber, carbon fiber or boron fiber. The proportion of fibers can vary from ten to sixty percent by weight relative to the weight of the base polymer.

Figure 7:
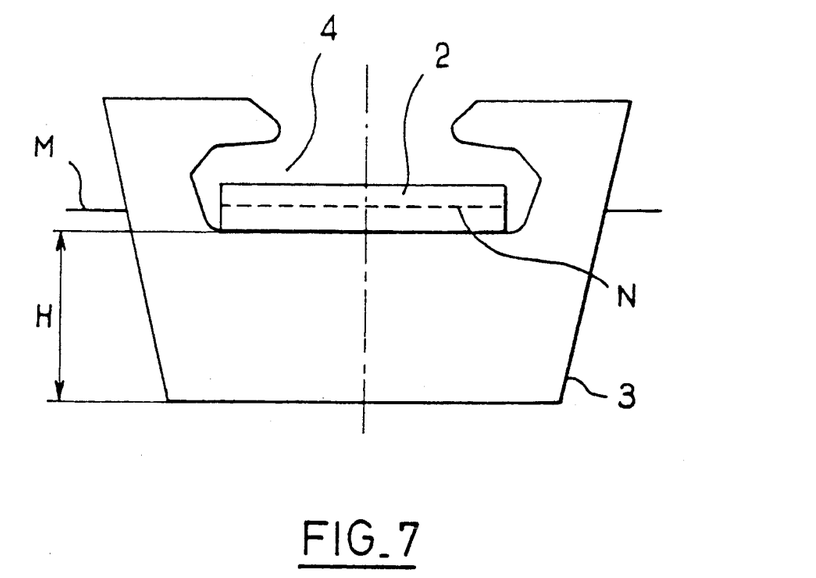
FIG. 7 is a side view of a preferred transverse link including the relative position of the endless flexible connecting element which incorporates features to make it possible to optimize the efficiency of the transmission mechanism.

Consequently, the transverse links 3 can be made of composites prepared on the basis of the following combinations, which are presented solely as non-limiting examples.

thermoplastic polyester resin + chalk
thermoplastic polyester resin + talc
thermoplastic polyester resin + metal powder
thermoplastic polyester resin + glass balls thermoplastic polyester resin + short aramid fibers
thermoplastic polyester resin + short glass fibers
thermoplastic polyester resin + short carbon fibers
thermoplastic polyester resin + short boron fibers
polyamide resin + chalk
polyamide resin + talc
polyamide resin + metal powder
polyamide resin + glass balls
polyamide resin + short aramid fibers
polyamide resin + short glass fibers
polyamide resin + short carbon fibers
polyamide resin + short boron fibers
semi-aromatic polyamide resin + chalk
semi-aromatic polyamide resin + talc
semi-aromatic polyamide resin + metal powder
semi-aromatic polyamide resin + glass balls
semi-aromatic polyamide resin + short aramid fibers
semi-aromatic polyamide resin + short glass fibers
semi-aromatic polyamide resin + short carbon fibers
semi-aromatic polyamide resin + short boron fibers
polyimide resin + chalk
polyimide resin + talc
polyimide resin + metal powder
polyimide resin + glass balls
polyimide resin + short aramid fibers
polyimide resin + short glass fibers
polyimide resin + short carbon fibers
polyimide resin + short boron fibers
thermosetting polyester resin + chalk
thermosetting polyester resin + talc
thermosetting polyester resin + metal powder
thermosetting polyester resin + glass balls
thermosetting polyester resin + short aramid fibers
thermosetting polyester resin + short glass fibers
thermosetting polyester resin + short carbon fibers
thermosetting polyester resin + short boron fibers
epoxy resin + chalk
epoxy resin + metal powder
epoxy resin + glass balls
epoxy resin + short aramid fibers
epoxy resin + short glass fibers
epoxy resin + short carbon fibers
epoxy resin + short boron fibers
formo-phenol resin + chalk
formo-phenol resin + talc
formo-phenol resin + metal powder
formo-phenol resin + glass balls
formo-phenol resin + short aramid fibers
formo-phenol resin + short glass fibers
formo-phenol resin + short carbon fibers
formo-phenol resin + short boron fibers
urea-formol resin + chalk
urea-formol resin + talc
urea-formol resin + metal powder
urea-formol resin + glass balls
urea-formol resin + short aramid fibers
urea-formol resin + short glass fibers
urea-formol resin + short carbon fibers
urea-formol resin + short boron fibers FIG. 7 shows a relative configuration of an endless flexible connecting element and one of the transverse links which makes it possible to optimize the efficiency of the preferred transmission mechanism. This configuration includes a transverse link 3 having a single groove 4 but could be easily altered to provide a transverse link with a double groove. The object of the invention is to provide a transmission mechanism in which, during operation, the relative slippage between the transverse links 3 and the endless flexible connecting element 2 is as small as possible and ideally equal to zero. To explain the relative configuration of the links and the endless flexible connecting element, an analogy to a conventional trapezoidal belt is appropriate. The analogous transmission mechanism of the present invention would include a "pitch line" which, according to the definition given by ISO 1081-1980, is "any circumferential line which, in the belt, retains the same length when it is curved perpendicular to its base". In terms of the operation of a belt in a pulley with a trapezoidal groove, the pitch line is, therefore, the line in which the slipping of the belt, caused by its flexing, relative to the pulley is at a minimum.

Similarly, it is possible to define, in the analogous transmission mechanism of the invention including thrust links, a pitch line which is in the upper portion of the set of transverse links. In terms of the level within the elementary transverse link, an "imaginary pitch line of the transverse link" can be defined as a unit element of the pitch line of the transmission mechanism.

The relative arrangement of the transverse links 3 on the endless flexible connecting element 2 makes it possible to optimize the efficiency of the transmission mechanism by reducing friction and slipping and thus fatigue caused by heating. The arrangement includes causing the neutral fiber N of the endless flexible connecting element 2 to coincide with the imaginary pitch line M of the transverse link. This can be achieved by either an appropriate positioning of the lug/recess devices to guide the transverse links among themselves in the catches 12a and 12b or providing an appropriate height H of the base 10 for the transverse links which employ positioning lugs as the guide devices.

Either type of device (centering and/or positioning lug and corresponding recess) can be used for the guidance of the transverse links among one another while still providing the relative configuration of the transverse links 3 and the endless flexible connecting element 2. Either is appropriate as long as the position of the elements of the device in the transverse link ensures the coincidence of the imaginary pitch line of the transverse link and the neutral fiber of the endless flexible connecting element.

Advantageously, in any one of the configurations of the transverse link 3 with a single or double groove 4, the bottom 15 of said groove will include a thin layer of material having a low coefficient of friction and/or a resistant to abrasion.

By way of a non-limiting example, such a thin coating of the bottom 15 of the groove 4 of the link 3 of FIG. 7 can consist of metal, such as stainless steel. Such a metal can be used even though the rest of the transverse line 3 remains non-metallic. Alternatively, the link 3 could consist of a polymer such as, for example, a polyethylene or a self-lubricating material containing molybdenum bisulfide. It will be apparent to those skilled in the art that such anti-abrasion or low-friction coating can be intimately bonded, either by direct attachment or by a physical-chemical attachment, to the composite material constituting the remainder of the transverse link 3.

FIGS. 8a, 8b, 8c, 8d and 8e include schematic illustrations and studies of the location of the stresses in a transverse link as a function of the load applied thereto. The illustrations and studies are based on the Von Mises law of mechanical fatigue, which is well known in the mechanical engineering art, and makes it possible to determine the location of stresses in a material as a function of the loads applied.

Figure 8A:
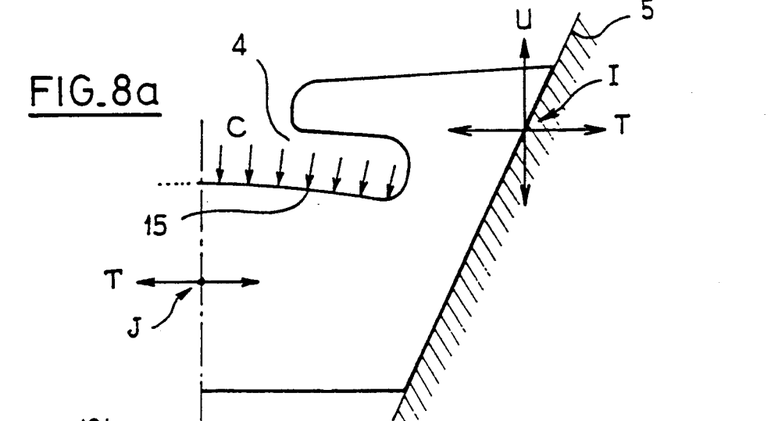
FIGS. 8a, 8b, 8c, 8d and 8e are fragmentary side views of a preferred transverse link to demonstrate the typical location of stresses in the transverse link, as a function of the load applied.

FIG. 8a, using a transverse half-link 3 as an example, illustrates the parameters of the study. A load C, which is equivalent to the tension of the endless flexible connecting element, is uniformly distributed on the bottom 15 of the groove 4. There is blockage in the directions U and T, in the zone I, by contact with the pulley 5 and in direction T, in zone J, at the axis of symmetry of the transverse link 3.

Figures 8B, 8C:
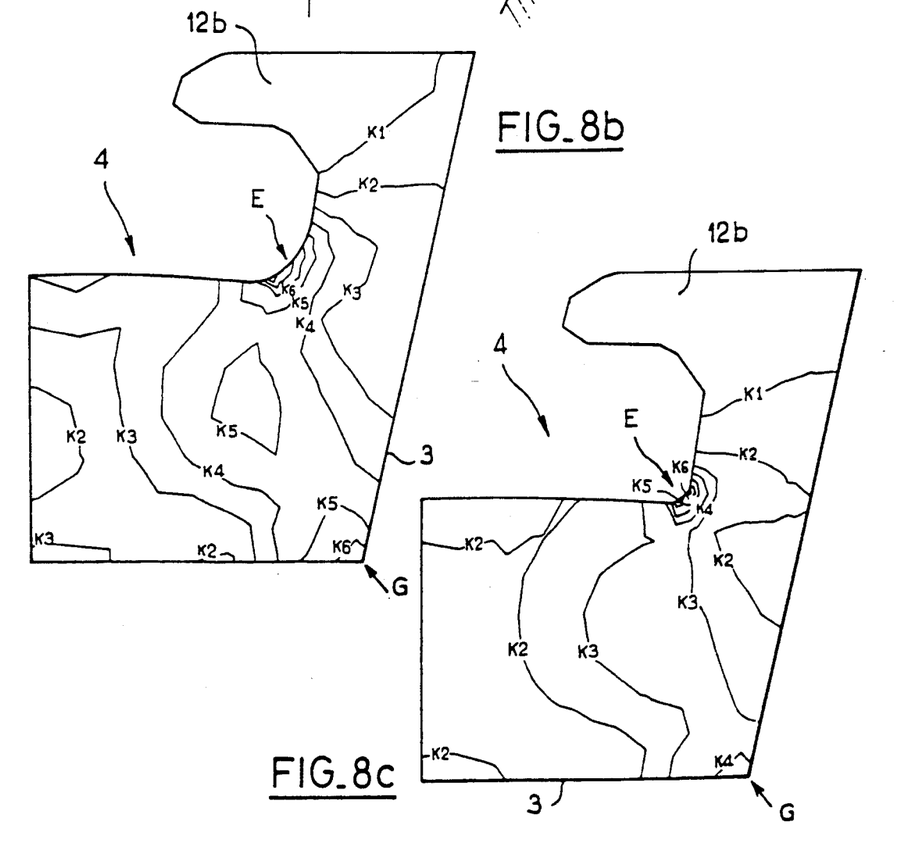

FIGS. 8b and 8c respectively show, by way of non-limiting examples, the isovalue curves of stresses on identical transverse links 3, which are eighteen millimeters wide at the large base, for two load cases. The load C is equal to 0.8 DaN per square millimeter for FIG. 8b, and the load C is equal to 4.8 DaN per square millimeter for FIG. 8c.

The following table indicates several values of the level of stresses in the two cases illustrated in FIGS. 8b and 8c.

| Level of stresses | C = 0.8 DaN/mm2 FIG. 8b | C = 4.8 DaN/mm2 FIG. 8c |
|---|---|---|
| K1 | 0.37 | 0.55 |
| K3 | 1.00 | 1.65 |
| K5 | 1.63 | 2.75 |
| K7 | 2.26 | 3.85 |
| K8 | 2.57 | 4.42 |

FIGS. 8b and 8c respectively show that the most highly-stressed zones of the transverse link 3 are, on one hand, the Zone E of the connection between the bottom 15 of the groove 4 and the lateral catch 12b and, on the other hand, the Zone G, at the extremity of the small base of the transverse link 3.

Figure 8D:
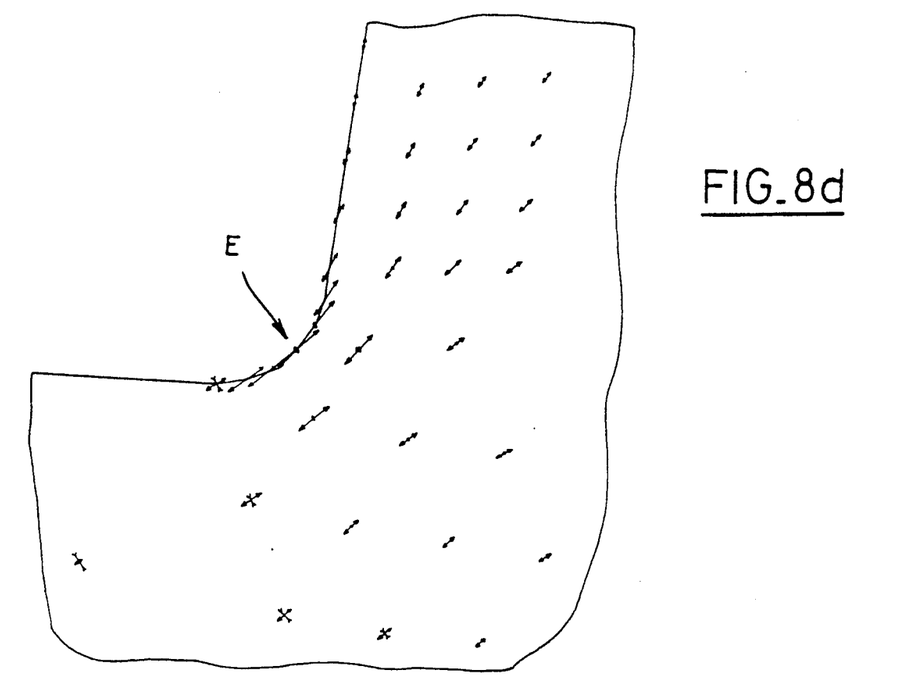
Figure 8E:
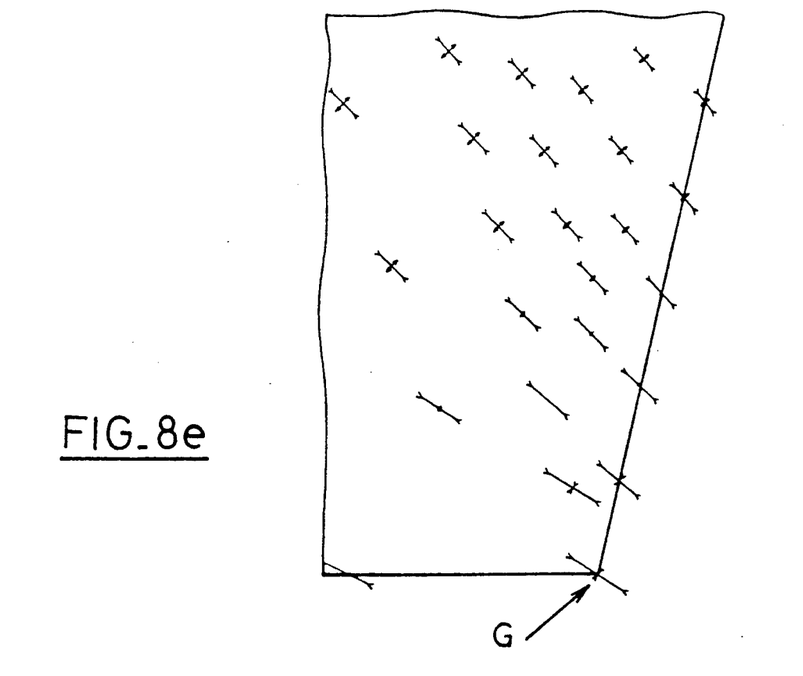

FIGS. 8d and 8e respectively show the principal stresses, in dimension and value, in Zone E for FIG. 8d and in Zone G for FIG. 8e, where the uniformly distributed load C equals 4.8 DaN/mm2. In both zones E and G, the component stresses in the plane resulting from the loads are oblique, since the principal stresses in Zone G, which are essentially compression stresses, are basically perpendicular to the principal stresses in Zone E, which are essentially tensile stresses.

Figure 9A:
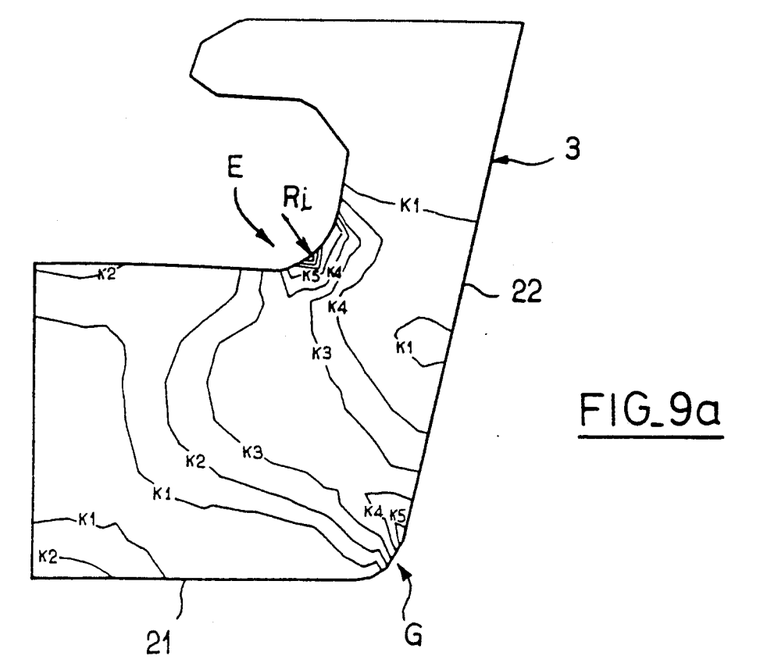
FIGS. 9a and 9b are fragmentary side views of a preferred transverse link to illustrate the influence of the shape parameters on the levels of stress of the transverse link.
Figure 9B:
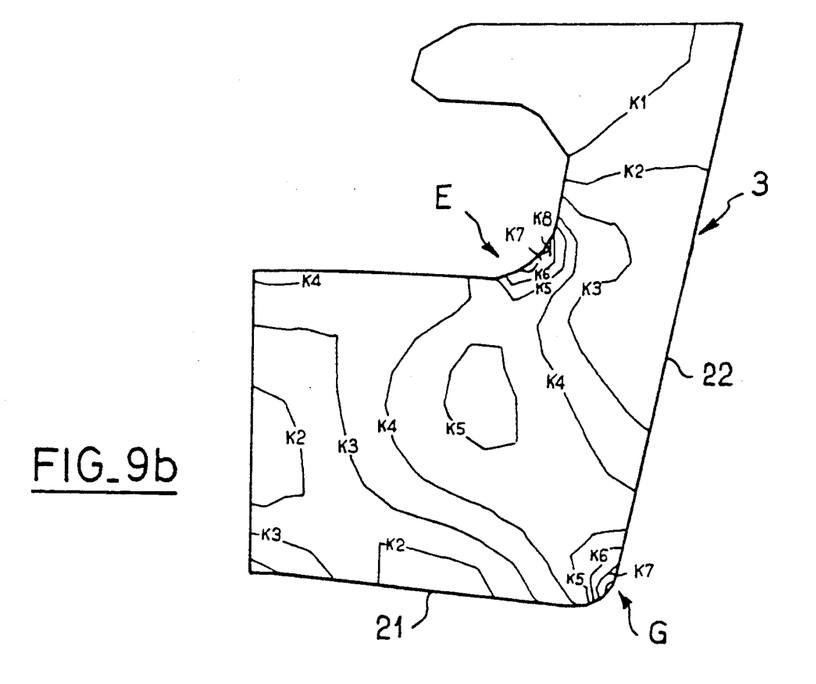

FIGS. 9a and 9b illustrate the influence of the shape parameters of the transverse link on the levels of stress, where the uniformly distributed load C equals 0.8 DaN per square millimeter, for a transverse link 3 whose large base is eighteen millimeters long. FIG. 9a shows the influence of a curvature with a radius R3 of 0.5 millimeters in Zone G, a curvature with an internal radius Ri of 1.5 millimeters in Zone E and a straight-line small base 21. FIG. 9b shows the additional influence of a slight concavity of the small base 21 of the transverse link 3.

FIGS. 9a and 9b are analogous to FIG. 8b discussed hereinabove. The values of the corresponding levels of stress have been given, by way of non-limiting examples, in the following table.

| Shape Parameters | FIG. 8b | FIG. 9a | FIG. 9b |
|---|---|---|---|
| Zone E | Ri = 1.5 | Ri = 1.5 | Ri = 1.5 |
| Zone G | acute angle | R3 = 0.5 | R3 = 0.5 |
| Small base 21 | straight line | straight line | convex |
| Level of stresses | C = 0.8 | C = 0.8 | C = 0.8 |
| K1 | 0.37 | 1.01 | 0.34 |
| K3 | 1.00 | 1.61 | 1.01 |
| K5 | 1.63 | 2.21 | 1.69 |
| K7 | 2.26 | 2.82 | 2.37 |
| K8 | 2.57 | 3.12 | 2.71 |

In Zone E, in the configuration in FIG. 8b, the stresses reach the levels K5 to K8 with respective values on the order of 1.6 DaN per square millimeter to 2.8 DaN per square millimeter. In the configuration in FIG. 9a, the stresses reach the levels K5 to K8 with respective values on the order of 2.2 DaN per square millimeter to 3.1 DaN per square millimeter. In the configuration in FIG. 9b, the stresses reach the levels K5 to K8 with respective values on the order of 1.7 DaN per square millimeter to 2.7 DaN per square millimeter. Therefore, the curvature with radius R3 of the connection of the small base 21 with the flank 22 of the transverse link 3 in Zone G and the slight concavity of the small base 21 have no notable influence on the level of stresses in Zone E.

In Zone G, where the small base 21 is connected to the flank 22 of the transverse link 3, the stresses reach the levels K5 and K6 in the configuration in FIG. 8b with respective values on the order of 2.3 DaN per square millimeter to 2.5 DaN per square millimeter. They reach the levels K4 and K5 with respective values on the order of 1.9 DaN per square millimeter to 2.2 DaN per square millimeter in the configuration in FIG. 9a. Accordingly, the rounded portion with a radius R3 connecting the small base 21 to the flank 22 in Zone G of the transverse link 3 makes possible an improvement of the level of stresses in Zone G.

On the other hand, the stresses in Zone G reach the levels K5 to K8 in the configuration in FIG. 9b for respective values on the order of 1.7 DaN per square millimeter to 2.8 DaN per square millimeter compared to values of 1.9 DaN per square millimeter to 2.2 DaN per square millimeter in the configuration in FIG. 9a. Consequently, the slight concavity of the small base 21 of the transverse link 3 has an adverse effect on the level of stresses in Zone G.

The preferred process for providing the transmission mechanism of the present invention comprises the following three Steps I, II, and III, which will be described for the embodiment of an endless flexible connecting element with a polymer compound having a rubber base, with a reinforcement including a continuous strand of aromatic polyamide, and with a low-friction coating including a film of ethylene polytetrafluoride. The links are constituted of semi-aromatic polyamide reinforced with short glass fibers including 30% by weight.

STEP I

The formation of the endless flexible connecting element, in the example in question, comprises the following operations:

A thin layer of the elastomer compound constituting the base is deposited on a drum. An armature consisting of aromatic polyamide, which has previously been subjected to a treatment designed to ensure its adherence to the elastomer compound, is laid out by filamentary winding on the base. A new layer of the elastomer compound is placed over the armature and receives a layer of adhesive, such as a solution of the elastomer compound in an appropriate solvent. Finally, a thin film of ethylene polytetrafluoride is applied to the surface.

The composite assembly thus produced is then subjected to a thermal treatment under pressure, such as in an autoclave, to ensure intimate bonding between the components and to simultaneously vulcanize the elastomer compound.

After cooling, the composite assembly is cut into individual endless flexible connecting elements in a particular width according to the application.

STEP II

The fabrication of the transverse links is most advantageously performed by injection molding in a closed mold with a large number of impressions of the appropriate shape. For example, more than three hundred links could be used to construct a transmission mechanism one meter long. The injection molding for the links in a multiple impression mold will therefore be economically attractive. Moreover, the utilization of a polymer compound for the fabrication of the transverse links permits a range of colors which makes it possible to differentiate applications and/or to improve the aesthetic appearance.

STEP III

The installation of the transverse links on the endless flexible connecting element is an operation which is easily mechanized because the complete symmetry of the transverse links eliminates the need to align the faces.

Accordingly, the transmission mechanism with transverse thrust links which is the object of the invention has the following advantages over the solutions of the prior art:

It can be fabricated economically by a process which can be easily automated because of the symmetry of the transverse links.

It does not require any mechanical hold-down means for the endless flexible connecting element in the grooves of the transverse links.

It is adaptable, since the choice of the number of transverse links, for a given length of endless flexible connecting element, makes it possible to create an operational clearance.

The use of colored transverse links minimizes the risk of errors during connection to a motor and also improves the aesthetic appearance.

The apparatus operates with dry friction and, therefore, does not require any lubrication or filtration installation and eliminates the need for sump drawing off.

It is relatively quiet since the transverse links, like the endless flexible connecting element, are made of polymer compounds and are not totally made of metal.

Heating produced during operation is limited because the speed of the endless flexible connecting element and the speed of the links are almost equal when the imaginary pitch line of the transverse links coincides with the neutral fiber of the endless flexible connecting element to cause a minimum, or even zero, slippage.

Without going beyond the context of the invention, those skilled in the art may make various modifications, both to the endless flexible connecting element and to the transverse links constituting the preferred transmission mechanism. In particular, such modifications could be directed to the shapes of said components, to the formulations of the polymer compounds and to the types of reinforcements employed.

In summing up, one aspect of the invention resides broadly in a transmission mechanism 1 with thrusting transverse links 3 for continuously variable speed transmissions, operating by dry friction and comprising at least one endless flexible connecting element 2 which is non-metallic, flexible, practically non-extensible longitudinally, and transverse links 3, also non-metallic, each comprising at least one groove 4 in which is engaged the endless flexible connecting element 2. The transmission mechanism 1 is characterized by the fact that the coefficient of friction between the endless flexible connecting element 2 and the transverse links 3 is a maximum of 0.4 and by the fact that the transverse links 3, which are axially perfectly symmetrical, have on each of their faces F1 and F2 a device for the guidance of the transverse links among themselves, not requiring the matching of the faces F1 and F2 during the assembly of the transverse links 3 on the endless flexible connecting element 2.

The endless flexible connecting element 2 may comprise a flat raw edge belt, having a longitudinal reinforcement, composed of textile wires or strands or metal wires or cables. The endless flexible connecting element 2 has at least one face in contact the transverse links 3 coated with a material with a low coefficient of friction.

The endless flexible connecting element 2 may comprise a belt having a hexagonal cross section, having a longitudinal reinforcement, and composed of textile wires or strands or metal wires or cables. The endless flexible connecting element 2 has at least the face in contact with the transverse links 3 coated with a material with a low coefficient of friction.

The transmission mechanism may comprise two endless flexible connecting elements 2 with an essentially circular cross section, coated on the surface with a material with a low coefficient of friction.

The coating with a low coefficient of friction of the endless flexible connecting element 2 may be an ethylene polytetrafluoride film, intimately bonded to the polymer compound constituting the base of the endless flexible connecting element 2.

The coating with a low coefficient of friction of the endless flexible connecting element 2 may be an oil varnish.

The base of the endless flexible connecting element 2 may be manufactured from an elastomer compound and the coating with a low coefficient of friction 9 may be made of polyethylene with a very high molecular weight.

The reinforcement 7 of the endless flexible connecting element 2 may be constituted by alternating metal cables twisted in the shape of an S and twisted in the shape of a Z.

The reinforcement 7 of the endless flexible connecting element 2 may be constituted by alternating textile strands twisted in the shape of an S and twisted in the shape of a Z.

The guidance device for the transverse links 3 in relation to one another may be constituted on the catches 12a and 12b of each of the faces F1 and F2 by a centering lug 13 and a recess 14, the catch 12a having the centering lug 13 on the face F1 and the recess 14 on the face F2 and, reciprocally, the catch 12b having the recess 14 on the face F1 and the centering lug 13 on the face F2.

The guidance device for the transverse links 3 in relation to one another may be constituted, on each of the faces F1 and F2 by a set of positioning lugs 19 and recesses 20 located in the base 10 of the transverse links 3.

The guidance device for the transverse links in relation to one another may be constituted simultaneously by the set of centering lug 13 and recess 14, located on the catches 12a and 12b and by the set of positioning lugs 19 and recesses 20 located in the base 10 of the transverse links 3.

The bottom 15 of the groove 4 of the transverse link 3 can have a coating with a low coefficient of friction.

The bottom 15 of the groove 4 of the transverse link 3 can have a coating which has abrasion resistant properties.

The transverse links 3 may be made of a thermoplastic polymer matrix composite and reinforced by fibers a maximum of thirty millimeters long.

The transverse links 3 may be made of a thermosetting polymer matrix composite and reinforced by fibers a maximum of thirty millimeters long.

The reinforcement of the composite constituting the transverse links 3 can be an aromatic polyamide, used in the proportion of ten to sixty percent by weight of the polymer matrix.

The reinforcement of the composite constituting the transverse links 3 can be glass fiber used in the proportion of ten to sixty percent by weight of the polymer matrix.

The reinforcement of the composite constituting the transverse links 3 can be carbon fiber used in the proportion of ten to sixty percent by weight of the polymer matrix.

The reinforcement of the composite constituting the transverse links 3 can be short boron fiber used in the proportion of ten to sixty percent by weight of the polymer matrix.

The endless flexible connecting element 2 may be manufactured by molding a so-called "thermoplastic fiber-reinforced" composite.

The guide device of the transverse links 3 in relation to one another can be oriented in such a way that, after assembly, the pitch line M of said transverse links 3 coincides with the neutral fiber N of the endless flexible connecting element 2.

The invention as described hereinabove in the context of a preferred embodiment is not to be taken as limited to all of the provided details thereof, since modifications and variations thereof may be made without departing from the spirit and scope of the invention.

What is claimed is:

1. A belt for operating by dry friction; said belt being for use in a continuously variable speed transmission, the continuously variable speed transmission having: a drive pulley; a driven pulley; each of said drive pulley and said driven pulley having conical surfaces to provide variable diameters thereof;

said belt for extending around each of said drive pulley and said driven pulley;

said belt comprising:

at least one endless flexible connecting element;

a plurality of links mounted on said endless flexible connecting element;

each of said links including at least one groove means for receipt of said endless flexible connecting element therein;

each of said links including guide means on side faces thereof;

said guide means of said each of said links mating with said guide means of each adjacent said link to maintain alignment of said links on the endless flexible connecting element; and said links being substantially non-metallic for operating dry one against the other.

2. The belt according to claim 1, wherein said links are non-metallic.

3. A belt for operating by dry friction for use in a continuously variable speed transmission, said belt comprising:

at least one endless flexible connecting element;

a plurality of links;

each of said links having at least one groove means configured for receipt of said at least one endless flexible connecting element therein;

each of said links including guide means on side faces thereof;

said guide means of said each of said links mating with said guide means of each adjacent said link to maintain alignment of said links on said at least one endless flexible connecting element; and said links being non-metallic for operating dry one against the other.

4. The belt according to claim 3, wherein said at least one endless flexible connecting element includes a non-metallic outer portion, said at least one endless flexible connecting element includes reinforcement means for restricting longitudinal extension thereof.

5. The belt according to claim 4, wherein said at least one endless flexible connecting element and said links include a maximum coefficient of friction therebetween of about 0.4.

6. The belt according to claim 4, wherein said reinforcement means includes alternating metal cables twisted in the shape of an S and twisted in the shape of a Z.

7. The belt according to claim 3, wherein said at least one endless flexible connecting element comprises a belt having a hexagonal cross section and longitudinal reinforcement therein and said at least one endless flexible connecting element has at least the face in contact with said links coated with a material with a low coefficient of friction.

8. The belt according to claim 3, including two of said endless flexible connecting elements which have an essentially circular cross section and said two endless flexible connecting elements are coated on a surface thereof with a material with a low coefficient of friction.

9. The belt according to claim 3, wherein said at least one endless flexible connecting element includes a base including a polymer compound, said at least one endless flexible connecting element includes a coating with a low coefficient of friction, and said coating is an ethylene polytetrafluoride film which is intimately bonded to said base of said at least one endless flexible connecting element.

10. The belt according to claim 3, wherein said at least one endless flexible connecting element includes a coating with a low coefficient of friction which is an oil varnish.

11. The belt according to claim 3, wherein said at least one endless flexible connecting element includes a base which is manufactured from an elastomer compound and a coating with a low coefficient of friction which is made of polyethylene with a very high molecular weight.

12. The belt according to claim 3, wherein said links are axially symmetrical.

13. The belt according to claim 3, wherein said reinforcement means includes alternating textile strands twisted in the shape of an S and twisted in the shape of a Z.

14. The belt according to claim 3, wherein each of said links includes at least a first catch and a second catch for partially defining said groove means, said guide means includes a guidance device for said links on each of said first catch and said second catch on each of the side faces thereof, said guidance device includes a centering lug and a recess, said first catch has said centering lug on a first of said side faces and said recess on a second of said side faces, and said second catch has a recess on said first of said side faces and said centering lug on said second of said side faces.

15. The belt according to claim 3, wherein said guide means includes a guidance device for said links on each of said side faces and said each of said side faces includes a positioning lug and a recess located in a base of said link.

16. The belt according to claim 3, wherein said guide means includes lug means and recess means respectively on each of said side faces of said each of said links, said lug means of said each of said links is for receipt within said recess means of said adjacent link, and said recess means of said each of said links is for receipt of said lug means of said adjacent link.

17. The belt according to claim 3, wherein said groove means includes a bottom which has a coating with a low coefficient of friction.

18. The belt according to claim 17, wherein said coating has abrasion resistant properties.

19. The belt according to claim 3, wherein said each of said links is made of one of a thermosetting polymer and a thermoplastic polymer matrix composite; and wherein said each of said links is reinforced by fibers having a maximum length of about thirty millimeters.

20. The belt according to claim 3, wherein said at least one endless flexible connecting element comprises a flat raw edge belt and longitudinal reinforcement therein and said at least one endless flexible connecting element has at least one face in contact with said links coated with a material with a low coefficient of friction.

21. The belt according to claim 3, wherein said each of said links includes a polymer matrix having reinforcement therein which is used in a proportion of about ten to about sixty percent by weight of said polymer matrix.

22. The belt according to claim 21, wherein said reinforcement comprises one of: an aromatic polyamide, a glass fiber, a carbon fiber, and a short boron fiber.

23. The belt according to claim 3, wherein said guide means and said groove means of said links maintains an orientation of said links to cause a pitch line of said links to coincide with a neutral fiber of said endless flexible connecting element.

24. A belt for operating by dry friction for use in a continuously variable speed transmission, said belt comprising:

at least one endless flexible connecting element;

a plurality of links;

each of said links including at least one groove means for receipt of said at least one connecting element therein;

said endless flexible connecting element including a non-metallic outer portion;

said links being substantially non-metallic for operating dry one against the other;

said endless flexible connecting element and said links for operating dry; and a maximum coefficient of friction between said endless flexible connecting element and said links of about 0.4.

25. The belt according to claim 24, wherein each of said links are axially symmetrical to have a first face and a second face which are identical and to have each of said first face and said second face of one of said links to include guide means for being matable with said guide means of said each of said first face and said second face of an adjacent one of said links when said one of said links and said adjacent one of said links receive said connecting element in said at least one groove means.

26. The belt according to claim 24, wherein said links are non-metallic.

27. The belt according to claim 25, wherein said links are non-metallic.

28. A belt for use in a continuously variable speed transmission, said belt comprising:

at least one endless flexible connecting element;

a plurality of links;

each of said links including at least one groove means for receipt of said at least one connecting element therein; and said each of said links being axially symmetrical;

said links are axially symmetrical to have a first face and a second face which are identical; and each of said first face and said second face of one of said links including guide means for being matable with said guide means of said each of said first face and said second face of an adjacent one of said links when said one of said links and said adjacent one of said links receive said connecting element in said at least one groove means.

* * * * *

UNITED STATES PATENT AND TRADEMARK OFFICE
CERTIFICATE OF CORRECTION

PATENT NO. : 5,123,879

DATED : June 23, 1992

INVENTOR(S) : Fabrice LECOUTURIER, Christian LEDEVEHAT, Robert COLLEY, Olivier PARGUEZ It is certified that error appears in the above-identified patent and that said Letters Patent is hereby corrected as shown below:

In column 9, line 43, after 'groove', insert --4--.

In column 11, immediately after line 37, insert the following new line:
--epoxy resin + talc--.

In column 16, line 22, after 'contact', insert --with--.

Signed and Sealed this

Twelfth Day of October, 1993

*Attest:*

BRUCE LEHMAN

*Attesting Officer*       *Commissioner of Patents and Trademarks*